Patented June 23, 1936

UNITED STATES PATENT OFFICE 2,045,345

MANUFACTURE OF CELLULOSE PRODUCTS

Henry Dreyfus, London, England

No Drawing. Application September 19, 1931, Serial No. 563,906. In Great Britain September 24, 1930

1 Claim. (Cl. 260—10)

The invention relates to the manufacture of cellulose and cellulosic products from wood, straw, grasses and the like.

Hitherto in the manufacture of cellulose and cellulosic products from wood, straw, grasses and the like, it has been the practice to attempt to dissolve out the lignins and other impurities from the cellulose. Thus the raw material has first been converted into a chemical pulp, for instance by the sulphite, soda, or sulphate processes. These chemical pulps are at best impure cellulose and require further treatment or purification before they can be successfully employed for the production of solutions of cellulose or of cellulose derivatives suitable for use in the manufacture of such products as artificial silk, films and the like. In fact the pulps are resistant to acetylation or esterification and require to be subjected to certain special treatments before they can be successfully applied to the manufacture of high grade cellulose acetates or cellulose esters, (see for instance U. S. Patent No. 1,711,110).

Further, in the industrial preparation of the pulps themselves, (e. g. by the sulphite process) a considerable proportion of the cellulose originally present in the wood, straw, grass or the like, is usually destroyed in spite of the fact that the finished pulp still contains pentosans, resins and other impurities. This proportion is often as much as 20% of the cellulose originally present in the wood or the like.

According to the invention I produce cellulose or cellulosic materials by a process comprising subjecting wood, straw, grasses or the like to treatment whereby the cellulose contained in such materials is dissolved out from the lignins and the like as opposed to dissolving out the lignins and the like. Suitably the cellulose can be dissolved out of the materials in the form of a solved xanthogenate (that is sodium, ammonium or other salt of a cellulose xanthic acid such as is produced in the well known viscose process of producing artificial silk, films and the like). The cellulose can be isolated or separated from the solutions so formed, preferably after ripening and after filtration, centrifuging or the like to separate insoluble impurities, in any way by which cellulose can be recovered from xanthogenate solutions, as for instance by the action of acids, carbon dioxide, or by heating. The separated or precipitated cellulose may be subjected to washing in any convenient manner to remove salts or other soluble impurities remaining therein after the precipitation or separation.

In performing the invention the wood, straw, grasses or the like are preferably used in as fine a form as possible e. g. in the form of small or fine chips or pieces, sawdust, or powder form. If desired the materials prior to the treatment for dissolving out the cellulose may first be treated with hot water or alkali, e. g. dilute caustic soda solution, or other resin solvent e. g. organic solvents, in order to remove as far as possible the resins from the materials.

In cases where the cellulose is to be dissolved out in the form of a xanthogenate, the xanthogenation treatment can be effected in any convenient way.

Thus the materials whether or not they have been submitted to treatment to extract the resins, may be treated with caustic alkali or ammonia to produce an "alkali cellulose" which may subsequently, it may be after ageing or ripening, be subjected to the action of carbon disulphide, and the xanthogenate solution so produced may, if desired be subjected to ripening.

Thus for instance the materials may be subjected to treatment with caustic soda of a concentration between about 15 to 20% or preferably 17 to 19% strength and the resulting soda cellulose after any desired ageing or ripening may be subjected to the action of carbon bisulphide. The treatment with the alkali or ammonia may consist in the mere immersion of the materials in the alkali or ammonia solution or the materials may be impregnated or kneaded with the solutions for any desired time sufficient to ensure thorough impregnation. It is, however, preferable that the materials should be treated with excess of the solutions (e. g. with about 6 to 10 or more times their weight of the solutions) and the excess liquor subsequently removed by pressing or the like, for example in such manner as to leave about 2 molecules of alkali or ammonia relatively to each molecule of cellulose present. As above mentioned the "alkali cellulose" produced by the action of alkali or ammonia may be submitted to ageing or ripening prior to treatment with carbon bisulphide. Such ageing or ripening can be effected for instance by leaving the "alkali cellulose" to stand for a period of time of about 2 to 3 days at a temperature not substantially exceeding 30° C. preferably at a temperature between 20 and 25° C.

The "alkali cellulose" may be subjected to the necessary action of carbon disulphide and the resulting viscose solution may be allowed to ripen in any convenient way, such for instance as that commonly employed in the viscose industry.

The quantities of alkali and carbon disulphide employed in the xanthogenation may be those commonly employed in the viscose industry e. g. about 2 molecules of alkali and 1 molecule of carbon bisulphide to each molecule of cellulose. If desired however, smaller quantities of alkali and carbon disulphide can be employed, in which case the xanthogenation can conveniently be performed by the process described in U. S. Patent No. 1,578,588.

As above mentioned the cellulose can be isolated or separated from the xanthogenate solution in any convenient way, as for instance by treatment with acids, carbon dioxide or by heating or other means capable of precipitating cellulose from solutions of its xanthogenates.

Prior to precipitation or separation of the cellulose from its xanthogenate solutions, the solutions may be subjected to filtering, centrifuging or the like to remove lignins and other insoluble impurities. The cellulose after precipitation or separation from the solutions can if desired or necessary be subjected to washing with water or the like to remove salts or soluble impurities as far as possible.

The cellulose so separated or produced by means of the invention is highly useful for the production of cellulose acetate or other cellulose esters or ethers or viscose solutions, cuprammonium cellulose solutions and the like and for the production of artificial silks, films or the like from such cellulose derivatives or solutions, and the invention is concerned not only with the production of the cellulose itself but also with the production of cellulose derivatives or cellulosic solutions and with the production of artificial silk, films and the like from such derivatives or solutions.

In cases where the invention is to be applied to the production of artificial silk, films or the like by the viscose process or cuprammonium process the solutions produced by the xanthogenation of the wood, straw, grasses or the like or by the treatment thereof by the cuprammonium process may themselves be employed i. e. they may be extruded into precipitating baths, preferably after careful filtration, in the manner such as heretofore employed in the manufacture of artificial silk, films or the like by the viscose process or by the cuprammonium process. I prefer, however, to separate or precipitate the cellulose from the solution and thereafter to re-dissolve the separated cellulose to form the necessary viscose or cuprammonium solutions.

In cases where the invention is to be applied to the production of cellulose esters or cellulose ethers the separated or precipitated cellulose can be submitted to the esterification or etherification in any convenient manner as for instance in a manner as indicated in U. S. Patents Nos. 1,280,975, 1,278,885, 1,280,974, 1,708,787, 1,711,111, 1,451,330, 1,451,331, 1,501,207 and U. S. applications S. Nos. 72,403 filed 30th November, 1925, 301,929, 301,927 filed 24th August, 1928, 321,752, 321,751, 321,750 filed 24th November, 1928, 403,138 filed 28th October, 1929, 401,381 filed 5th August, 1920, 162,214 filed 19th January, 1927. When subjecting the cellulose to acetylation or other esterification it is often advantageous to subject the cellulose to pretreatment with acids, particularly organic acids, although it should be noted that the cellulose is already highly reactive. For instance the cellulose may advantageously be subjected to the pretreatments described in U. S. Patents Nos. 1,711,110, 1,697,907 and U. S. applications S. Nos. 66,103 filed 31st October, 1925, 301,928 filed 24th August, 1928, 263,979 filed 22nd March, 1928, 328,306 filed 24th December, 1928, 348,981 filed 21st March, 1929. If desired or necessary the cellulose can of course be subjected to any convenient bleaching or like treatment prior to the re-xanthogenation, esterification or etherification.

By means of the invention cellulose or cellulosic materials can be produced in a highly satisfactory manner from wood, straw, grasses and the like; further the cellulose can be separated from the lignins, resins and other impurities present in the initial material without the excessive losses of cellulose heretofore encountered in the preparation of cellulose by the chemical pulping methods. Further the cellulose and cellulosic materials obtainable by the process of the invention are of very high grade, as by means of the invention, unlike the chemical pulping methods heretofore employed, attack upon or degradation of the cellulose molecule can be largely or entirely avoided.

The following example illustrates the invention:—

*Example*

Ligno-cellulosic material, e. g. wood in the form of fine chips or sawdust, is first treated with caustic soda of about 5% strength to remove resinous constituents. The treatment is effected at normal temperatures and the liquor containing the resinous constituents in solution is afterwards removed by filtration, centrifuging or the like.

The cellulosic materials substantially free from resinous constituents are then steeped in caustic soda solution of about 18% strength in a quantity equal to about 8–9 times the weight of the cellulosic materials after which the excess liquor is expressed from the materials to leave about two molecules of alkali to each molecule of cellulose treated.

The alkali cellulose obtained is allowed to ripen at a temperature of between 23–25° C. for a period of 2–3 days, whereafter it is mixed or churned with carbon disulphide in quantity equal to about one molecule of carbon disulphide for each molecule of cellulose treated for a period of about 2–3 hours at a temperature of between about 23–27° C.

The product obtained is dissolved in caustic soda solution of 3–4% strength and the solution subjected to filtration, centrifuging or the like operation to separate lignins and other undissolved materials, whereafter the solution is subjected to coagulation. The coagulation is preferably effected by spraying or atomizing the solution into an atmosphere of steam and/or gaseous hydrogen chloride.

The precipitated cellulose, after washing and desulphurization, may be employed with advantage for all purposes which require a highly pure cellulose, such, for instance, as in the manufacture of cellulose derivatives such, for example, as cellulose acetate or in the production of cellulosic solutions such as are employed in the production of artificial silk.

What I claim and desire to secure by Letters Patent is:—

Process for the manufacture of cellulose that is capable of being employed for making cellulose derivatives, comprising treating lignocellulosic material to remove resinous material, then treating with excess alkali solution, then treating the product so obtained with carbon disulphide to form the xanthate, removing lignin and other insoluble matter from the solution formed, and regenerating cellulose from the solution, whereby cellulose of sufficient purity to be employed for making cellulose derivatives is produced.

HENRY DREYFUS.